United States Patent

Sicotte et al.

[11] Patent Number: 6,074,563
[45] Date of Patent: *Jun. 13, 2000

[54] DEHYDRATION OF DRILLING FLUIDS

[75] Inventors: Paul Sicotte, Fort St. John; Garth Iverach, Calgary, both of Canada

[73] Assignees: P.G.S Holdings Ltd, British Columbia; Diversity Technologies Corp., Alberta, both of Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,021

[22] Filed: May 6, 1997

[30] Foreign Application Priority Data

May 6, 1996 [CA] Canada ................................. 2175859

[51] Int. Cl.$^7$ .............................. B01D 17/00; C09K 7/06
[52] U.S. Cl. .............................. 210/749; 175/48; 175/64; 175/66; 73/61.43
[58] Field of Search ................................. 210/749, 747; 175/66, 48, 59, 64, 206, 339, 417; 73/152.19, 152.21

[56] References Cited

U.S. PATENT DOCUMENTS

| | | | |
|---|---|---|---|
| 2,316,967 | 4/1943 | Miller | 507/126 |
| 3,557,876 | 1/1971 | Tragesser | 166/292 |
| 3,595,316 | 7/1971 | Myrick, III | 166/303 |
| 3,702,564 | 11/1972 | Chenevert | 73/73 |
| 3,750,766 | 8/1973 | Thompson et al. | 175/50 |
| 4,018,679 | 4/1977 | Bolsing | 405/264 |
| 4,374,737 | 2/1983 | Larson et al. | 507/130 |
| 4,663,076 | 5/1987 | Clapper et al. | 252/356 |
| 4,713,183 | 12/1987 | Patel et al. | 507/128 |
| 4,834,194 | 5/1989 | Manchak, Jr. | 175/50 |
| 4,895,665 | 1/1990 | Colelli et al. | 210/710 |
| 4,904,603 | 2/1990 | Jones et al. | 436/25 |
| 5,337,824 | 8/1994 | Cowan | 166/293 |
| 5,430,237 | 7/1995 | Sharp | 588/252 |
| 5,439,056 | 8/1995 | Cowan | 166/293 |

OTHER PUBLICATIONS

Walter F. Rogers Excerpt from "Composition and Properties of Oil Well Drilling Fluids" Gulf Publishing Company, Houston, Texas (1953), p. 478 and p. 577.

Gray et al. Excerpt from "Composition and Properties of Oil Well Drilling Fluids" Fourth Edition (1981), p. 63.

*Primary Examiner*—David A. Simmons
*Assistant Examiner*—Fred Prince
*Attorney, Agent, or Firm*—Foley & Lardner

[57] ABSTRACT

Calcium oxide ($C_aO$—Hot Lime—Processed Lime) is added to a Hydrocarbon Based Fluid (Crude Oil—Refined Oil—Diesel Fuel—Mineral Oil—etc.) used as a drilling fluid to drill bore holes (Oil and Gas Wells—Mine Shafts—etc.) to react with any water ($H_2O$) present to generate a water free fluid. Several advantages result from accomplishing the water removal process including higher drilling rates, lower fluid preparation and maintenance costs, lower drilling fluid pumping costs, improved solids removal from the drilling fluid at the surface, improved bore hole conditions and improved environmental cleanup of the drill solids waste.

6 Claims, No Drawings

DEHYDRATION OF DRILLING FLUIDS

BACKGROUND OF THE INVENTION

The process of drilling bore holes involves in part the circulation of drilling fluid from a series of surface storage tanks down the inside of the drill string, through the drill bit, and up the annular space between the drill string and the bore hold back to the surface storage tanks.

Several functions are performed by the drilling fluid during circulation:

1. Cool the drill bit.
2. Transmit hydraulic power to the bit from engines at the surface.
3. Remove cuttings from around the drill bit and transport them to the surface.
4. Maintain the chemical and physical integrity of the wall of the well bore.
5. Prevent the influx of formation fluids and gases into the bore hole.
6. Release drill cuttings to waste by settling and by the action of various mechanical systems normally provided to a drilling rig (screens, hydrocyclones and centrifuges).

It is generally known that drilling efficiency which is partly determined by the rate of penetration and bore hole condition can be increased by proper selection of, or improvements to, the drilling fluid.

A lower viscosity drilling fluid as compared to a higher viscosity drilling fluid can be instrumental in providing a larger proportion of surface hydraulic power to the drill but because the pressure losses through the pumps, connections and interior of the drill string are minimized. Penetration rate is partly related to the hydraulic power supplied to the drill bit.

A lower viscosity drilling fluid also contributes to higher penetration rates because of higher efficiency in the formation and removal of cuttings from below the drill bit during the instant in which the drill bit crushes the rock.

A low viscosity drilling fluid as compared to a higher viscosity drilling fluid also ultimately promotes drilling efficiency by more effectively releasing drill cuttings in the various surface solids removal processes.

Knowledge of the drilling process indicates that penetration rate is in part related to the density of the drilling fluid or more explicitly the differential pressure across the interface between the drilling fluid and the uncut formation rock below the drill bit. The lower the differential pressure (pressure due to the drilling fluid minus the pressure due to the formation) the higher the penetration rate.

Bore hole integrity is one of the major contributors to drilling efficiency in that many problems such as drill string torque and drag, stuck drill string, loss of drilling fluid circulation, and poor bore hole cleaning can be avoided or diminished by good bore hole conditions. It is known that many well bore integrity problems are associated with the negative effects of water on various geological formations that may be penetrated while drilling. To avoid these effects, various types of oil continuous phase drilling fluids have been devised and used.

By far the best known and most widely used oil continuous phase drilling fluid is an invert oil emulsion which incorporates an aqueous salt solution in the form of very fine droplets as an internal or discontinuous phase, this internal or discontinuous phase usually constitutes 3% to 30% of the liquid portion of the drilling fluid. This invert oil emulsion drilling fluid is stabilized by "water in oil" emulsifiers, surfactants, and oil wetting agents. This invert oil emulsion drilling fluid can be viscosified with chemically treated clays or in some cases, polymeric viscosifiers.

It is known, and generally understood, that when water is emulsified in oil, as an internal or discontinuous phase, the viscosity of that oil increases as the percentage of water emulsified increases.

In the context of invert oil emulsion drilling fluids, bore hole integrity is related to the concentration and type of salt water solution used to produce the internal or discontinuous phase and each geological formation that may be drilled can theoretically require a somewhat different salt water internal or discontinuous phase to assure bore hole integrity. Invert oil emulsion drilling fluids are formulated to provide salt water internal or discontinuous phases which tend to dehydrate through the process of osmosis in most geological formations and thereby minimize well bore hole damage. Although this approach has been successful in producing stable bore holes it is nevertheless a compromise and constitutes good reason to contemplate and search for an oil continuous phase drilling fluid which could function without a salt water internal or discontinuous phase.

It has been a practice to drill with an oil drilling fluid without any added materials at least initially. As drilling progresses, however, the oil drilling fluid accumulates water from the surface (rain, snow, spills etc.) and/or from water generated by the drilling of certain geological formations. This accumulation of water tends to lead to a variety of drilling problems including the formation of mud rings (clumps of drill cuttings sticking to one another) the blinding of drill solids removal screens caused presumably by the variable wetting (oil and water) of the screen, and the loss of bore hole integrity through the absorption of this free water by sensitive geological formations. The normal response to this situation is to add, one of, or a combination of, water in oil emulsifiers, surfactants and wetting agents to the drilling fluid. This has the effect of oil wetting the drilled solids and drilled solids removal screens and emulsifying excess water so that it becomes an internal or discontinuous phase. The net result is the transformation of what began as a water free oil drilling fluid to inverted oil emulsion drilling fluid.

The principle object of the present invention is to avoid or at least delay the changing of a water free oil drilling fluid to an invert oil emulsion drilling fluid because of the presence of water. A further object of the invention is to maintain a water free oil drilling fluid without changing or minimally changing current drilling and drilling fluid practices.

SUMMARY OF THE INVENTION

The present invention provides a method of removing water from a hydrocarbon based fluid used as a drilling fluid to drill bore holes, comprising:

a) determining the presence and calculating the amount of water in said drilling fluid; and
b) adding CaO to said drilling fluid to remove the said water.

In one embodiment of the invention, the removal of water from the hydrocarbon based drilling fluid is characterized by the following reaction:

$$H_2O + CaO > Ca(OH)_2$$

wherein $H_2O$ is water, CaO is calcium oxide, and $Ca(OH)_2$ is calcium hydroxide.

In another embodiment of the invention, the method further comprises adjusting the addition rate of the CaO added to the hydrocarbon drilling fluid as required to ensure that the drilling fluid is water free.

In yet another embodiment of the invention, the CaO is added to the hydrocarbon based drilling fluid at a ratio of 3.11 kilograms per kilogram of water to be removed.

DETAILED DESCRIPTION OF THE INVENTION

In the following text all hydrocarbon based fluids whether crude or refined will be referred to as oil.

In the following text the chemical compounds will be referred to by their proper chemical name or proper chemical abbreviation:

| Chemical Name | Chemical Abbreviation | Generic Names |
|---|---|---|
| Calcium Oxide | CaO | Hot Lime Processed Lime |
| Calcium Hydroxide | $Ca(OH)_2$ | Hydrated Lime Slaked Lime |
| Water | $H_2O$ | |

The invention relates to a method by which accumulated water can be removed from a drilling fluid comprised of oil.

Accordingly, the invention comprises a method of removing water from oil used as a drilling fluid in bore hole drilling. The method includes the steps of calculating the volume of water present in the continually circulating drilling fluid and adding co to the circulating drilling fluid to effect the water removal. The rate of CaO addition is adjusted if and when the water content varies.

The presence and amount of water accumulated in an oil drilling fluid during the drilling of a bore hole can be determined by the use of conventional oil drilling fluid test equipment, namely:

1. An Emulsion Stability Meter:

This instrument is usually used to provide a relative numerical value for the strength of the water in oil emulsion of an invert oil emulsion drilling fluid. The instrument applies an increasing voltage between two electrodes immersed in a sample of invert oil emulsion drilling fluid. The applied voltage at which current begins to pass between the electrodes indicates the emulsion breakdown and is called the electrical stability of the invert oil emulsion drilling fluid. In the context of a water free oil drilling fluid the meter can be used to detect water in the drilling fluid and drill cuttings. A test is conducted by taking a sample of the return drilling fluid from the bore hole, allowing the drill cuttings to settle, and immersing the electrodes in the fluid and settled drill cuttings. A water free condition for both drilling fluid and drill cuttings results in an emulsion stability value of 2000 volts (maximum value provided by the meter). The presence of water results in a lower meter reading and is a qualitative indication of the presence of water.

2. Drilling fluids retort or still (maximum test temperature 580 Degrees Celsius). The drilling fluids retort or still is used in drilling fluid testing to quantitatively measure the oil, water, and solids content of a drilling fluid, this is accomplished by distilling, condensing and collecting the volume of the oil and water phases from a known volume of drilling fluid sample and then subtracting these volumes from the known volume of drilling fluid sample to give the non-distillable solids volume.

The maximum temperature of the drilling fluids retort or still is controlled to below 580 degrees Celsius when testing for water in a water free oil drilling fluid because at that temperature the thermal decomposition of $Ca(OH)_2$ (the product of the mixing of CaO and water) occurs to yield CaO and water.

$Ca(OH)_2 + 580$ Degrees Celsius $> CaO + H_2O$

The chemical reaction between water and calcium oxide may be described by the following equation:

$H_2O + CaO > Ca(OH)_2$

This equation states that the chemical compound called water reacts with the chemical compound called calcium oxide to produce the chemical compound called calcium hydroxide.

From the chemical equation of the removal of water from oil by adding CaO ($H_2O+CaO>Ca(OH)_2$) it is possible to determine the amount of CaO that would have to be added to an oil to remove a known amount of water. The method of accomplishing this determination is:

1. Chemical compounds are made up chemical elements each of which has a specific unique relative mass.

2. The chemical elements, their symbols and their relative masses which make up the chemical reaction in this invention are as follows:

| Chemical Element | Chemical Symbol | Relative Mass |
|---|---|---|
| Hydrogen | H | 1.008 |
| Oxygen | O | 16.000 |
| Calcium | Ca | 40.080 |

3. When chemical elements combine to form chemical compounds the relative masses of the constituent chemical elements are added to give a relative mass of the resultant chemical compound. This resultant relative mass is called the compound's molecular weight.

4. The molecular weights of calcium oxide, calcium hydroxide and water are calculated as follows:

| | |
|---|---|
| a) | CaO = Ca + O |
| | 40.080 + 16.000 = 56.080 |
| b) | $Ca(OH)_2$ = Ca + 2O + 2H |
| | 40.080 + 32.000 + 2.016 = 74.096 |
| c) | $H_2O$ = 2H + O |
| | 2.016 + 16.000 = 18.016 |

5. The chemical equation of the removal of water from oil by adding CaO can now be written to represent the molecular weights involved for each chemical compound involved in the reaction of the removal of water from oil by adding CaO.

$H_2O + CaO > Ca(OH)_2$ 18.016 - 56.080 = 74.096

6. The chemical equation of the removal of water from oil by adding CaO now states, in addition to what was previously stated, that 18.016 relative mass units of $H_2O$ will react with 56.080 relative mass units of CaO to produce 74.096 relative mass units of CaO to produce 74.096 relative mass units of Ca $(OH)_2$. This above statement could also be stated that to remove 1.00 (18.016/18.016) relative mass unit of $H_2O$ from a volume of oil it would require 3.11 (56.080/18.016) relative mass units of CaO to produce 4.11 (74.096/18.016) relative mass units of Ca $(OH)_2$. The term relative mass unit means that any set of consistent mass units can be used in arithmetic calculations outlined by a chemical equation. These mass units can be milligrams, grams, kilograms, tonnes, ounces, pounds and so on.

7. Example Calculation:
   Determine the amount of CaO that would have to be added to a drilling fluid volume of 600 cubic meters which has been determined to have an $H_2O$ content by retort analysis of 1.3 kilograms per cubic meter.
   We know from a previous statement that it takes 3.11 relative mass units of CaO to react with 1.00 relative mass unit of $H_2O$ to react with 1.00 relative mass unit of $H_2O$ and therefore since we also know the volume of total drilling fluid (600 cubic meters) and the concentration of $H_2O$ (1.3 kilograms per cubic meter) in this drilling fluid we can calculate the amount of CaO in kilograms required to remove this $H_2O$ by multiplying the volume of drilling fluid by the concentration of $H_2O$ in the drilling fluid and then multiplying by 3.11.

$$600 \times 1.3 \times 3.11 = 2425.8 \text{ kilograms}$$

In a field test, a number of bore holes were drilled in which a water free oil drilling fluid (water was not allowed to be recirculated down the drill string) was consistently maintained by adding CaO to the drilling fluid as indicated by testing for water by the above mentioned instrumental tests and calculating the amount of CaO required to treat out any water while following standard drilling fluid maintenance procedures.

In these field tests CaO was mixed continuously while drilling to maintain a water free oil drilling fluid system. Once an initial CaO addition rate was established the drilling fluid surface returns were tested for water and the CaO addition rate was adjusted from the results of these tests to ensure that the drilling fluid being pumped down the drill string to the drill bit was water free.

The results of these field tests proved that when an oil drilling fluid system was maintained in a water free state by CaO additions, an appreciable increase in drilling efficiency and an appreciable reduction in drilling fluids cost (in comparison to invert oil emulsion drilling fluids) occurred. In some of these field tests the water free oil drilling fluids were converted to invert oil emulsion drilling fluids by adding salts, salt water brine and invert oil emulsion drilling fluids chemicals and that the above stated efficiency and cost savings were still observed while drilling with the water free oil drilling fluids prior to converting to an invert oil emulsion drilling fluids.

It will therefore be evident that the reasons for the improvement in drilling efficiency and fluids cost performance rests in the properties of a water free oil drilling fluid system in comparison to water based drilling fluids and invert oil emulsion drilling fluids of which some of the reasons are:

1. The lower viscosity of water free oil drilling fluid:
   a) Allows a greater amount of hydraulic power to be transmitted to the drill bit thereby contributing to higher penetration rates.
   b) Contributes also to higher penetration rates because of higher efficiency in the formation and removal of cuttings from below the drill bit during the instant in which the drill bit crushes the rock.
   c) As compared to a higher viscosity drilling fluid, also promotes drilling efficiency by more effectively releasing drill cuttings in the various surface solids removal processes.

2. Because of the lower density of a water free oil drilling fluid, in comparison to water based drilling fluids and invert oil emulsion drilling fluids, the drilling rate is increased because of the lower differential pressure (pressure due to the drilling fluid minus the pressure due to the formation) across the interface between the drilling fluid and the uncut formation rock below the drill bit.

3. Water free oil drilling fluids (the least expensive of the oil drilling fluids to prepare and maintain) and invert oil emulsion drilling fluids both produce, in comparison to water based drilling fluids, a more stable bore hole which in turn contributes to overall drilling efficiency by reducing drill string torque and drag and the incidence of sticking the drill string due to drill cuttings accumulations in bore hole washouts (over gauge hole). Closer to gauge bore hole conditions also contribute to drilling efficiency because the overall smaller volume requires less fluid to drill and less cement for any bore hole into which casing may be inserted.

Oil continuous phase drilling fluids are valuable and as such are seldom the subject of disposal as they can be reused or returned for refining. The drill cuttings which have oil adhering to them are disposed of in controlled manner. The drill cuttings deposited at surface from drilling with oil continuous phase drilling fluids are generally disposed of by land farming. The surface area and chemical loading requirements for the land farming are determined by the regulatory agency in charge of wastes for the jurisdiction in which the drill cuttings are to be land farmed. The two main chemical criteria that determine the land farm area loading are the oil and salt content of the drill solids and the oil continuous phase drilling fluid adhering to the drill solids. The oil that is present in and adhering to the drill solid is allowed to naturally biodegrade and is checked periodically in the land farm area and once it meets regulatory loading requirements, a reclamation certificate is issued for the land farm area. Most salts, however, do not biodegrade and therefore the more salt in the drill cuttings, the more land that is required to land farm. Water free oil drilling fluids (the least expensive of the oil drilling fluids to prepare and maintain) contain no salts and therefore the drill solids generated with a water free oil drilling fluids require less area to land farm than drill solids generated from drilling with an invert oil emulsion drilling fluids.

The drill solids from water free oil drilling fluids may contain or have adhering to them both unreacted CaO and $Ca(OH)_2$. Both of these chemical compounds will react with the $CO_2$. Both of these chemical compounds will react with the $CO_2$ (carbon dioxide) and $H_2O$ in the atmosphere to produce $CaCO_3$ (calcium carbonate—limestone) which is environmentally innocuous. The chemical equations for the above stated reactions are:

$$CO_2 + H_2O > H_2CO_2 \text{ (carbonic acid)}$$

$$CaO + H_2CO_3 > CaCO_3 + 2H_2O$$

$$Ca(OH)_2 + H_3CO_3 > CaCO_3 + H_2O$$

Accordingly, it will be appreciated that the addition of CaO, as contemplated in the subject invention, constitutes a valuable and significant advance in the art.

While various modifications can be made to the invention as described, the scope of the invention is defined by the appended claims.

What is claimed is:

1. A method of drilling a bore hole, said method comprising:
   (a) drilling a bore hole with a drill bit;
   (b) adding a drilling fluid through said drill bit;
   (c) continually monitoring the presence of water in the drilling fluid and adding CaO to the drilling fluid at a rate sufficient to maintain the drilling fluid free of water, and
   (d) removing from surface returns of the drilling fluid the calcium hydroxide and cuttings produced by the drilling.

2. A method according to claim 1, wherein the removal of water from the hydrocarbon based drilling fluid is characterized by the following reaction:

$$H_2O + CaO > Ca(OH)_2$$

wherein $H_2O$ is water, CaO is calcium oxide, and $Ca(OH)_2$ is calcium hydroxide.

3. A method according to claim 1, wherein the amount of said CaO added to said drilling fluid is adjusted to ensure that the drilling fluid is water free.

4. A method according to claim 1, wherein said CaO is added to said hydrocarbon based drilling fluid at a ratio of 3.11 kilograms per kilogram of water to be removed.

5. A method according to claim 1, wherein the volume of water is calculated from a sample of drilling fluid surface return.

6. A method according to claim 1, wherein the amount of CaO added to the drilling fluid is adjusted to ensure that the drilling fluid is water free and wherein the adjustment is based upon a calculation of the volume of water in a sample of the drilling fluid.

* * * * *

UNITED STATES PATENT AND TRADEMARK OFFICE
CERTIFICATE OF CORRECTION

PATENT NO. : 6,074,563
DATED : June 13, 2000
INVENTOR(S) : Paul Sicotte et al.

Page 1 of 1

It is certified that error appears in the above-identified patent and that said Letters Patent is hereby corrected as shown below:

<u>Column 7, claim 1,</u>
Line 8, before "drilling fluid" insert -- hydrocarbon based --.

Signed and Sealed this

Thirteenth Day of November, 2001

Attest:

*Nicholas P. Godici*

NICHOLAS P. GODICI
*Acting Director of the United States Patent and Trademark Office*

*Attesting Officer*